United States Patent
Katayama et al.

(10) Patent No.: US 8,005,161 B2
(45) Date of Patent: Aug. 23, 2011

(54) METHOD, HARDWARE PRODUCT, AND COMPUTER PROGRAM PRODUCT FOR PERFORMING HIGH DATA RATE WIRELESS TRANSMISSION

(75) Inventors: Yasunao Katayama, Tokyo (JP); Daiju Nakano, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 654 days.

(21) Appl. No.: 12/113,251

(22) Filed: May 1, 2008

(65) Prior Publication Data

US 2009/0274221 A1    Nov. 5, 2009

(51) Int. Cl.
H04L 27/12 (2006.01)
H04L 27/14 (2006.01)
(52) U.S. Cl. .................. 375/274; 375/305; 375/336
(58) Field of Classification Search .............. 375/274, 375/305, 336
See application file for complete search history.

(56) References Cited

U.S. PATENT DOCUMENTS

| | | | | |
|---|---|---|---|---|
| 4,649,529 | A * | 3/1987 | Avicola | 367/149 |
| 4,942,592 | A * | 7/1990 | Leitch et al. | 375/336 |
| 5,708,662 | A * | 1/1998 | Takashima | 370/496 |
| 2003/0026199 | A1* | 2/2003 | Myers | 370/208 |
| 2004/0077353 | A1* | 4/2004 | Mahany | 455/448 |

FOREIGN PATENT DOCUMENTS

JP    11098205    9/1999

OTHER PUBLICATIONS

Searching Patent Abstracts Japan, [online]; [retrieved on Dec. 18, 2007]; retrieved from the Internet http://www.19.ipdl.inpit.go.jp/PA1/result/detail/main/wAAAYGaiYbDA411098205P... Minoru et al., "Demodulator for Digital Radio Communication", Patent Abstract JP 11-098205 Sep. 4, 1999, 2p.

S. Tatu et al., "A New Direct Millimeter-Wave Six-Port Receiver", IEEE Transactions on Microwave Theory and Techniques, Dec. 2001, pp. 2517-2522, vol. 49, No. 12, IEEE.

Y. Ahmed, "A Model-Based Approach to Demodulation of Co-Channel MSK Signals", Thesis Submitted to the faculty of the Virginia Polytechnic Institute and State University in partial fulfillment of the degree of Master of Science in Electrical Engineering, Dec. 2002, pp. 1-94, Blacksburg, VA, United States.

* cited by examiner

*Primary Examiner* — David B Lugo
(74) *Attorney, Agent, or Firm* — Cantor Colburn LLP; Vazken Alexanian

(57) ABSTRACT

A method, a hardware product, and a computer program product for performing high data rate wireless transmission and reception. Minimum shift-keyed (MSK) data is transmitted by multiplexing a first MSK data stream and a second MSK data stream wherein the first MSK data stream is substantially 90-degree phase-shifted with respect to the second MSK data stream. The transmitted MSK data is received by performing phase recovery and demodulation using an FM discriminator having a demodulation circuit for implementing a 45-degree phase shift prior to demodulation.

12 Claims, 18 Drawing Sheets

$$\phi_1(t) = \sqrt{\frac{2}{T_b}} \quad \cos(\frac{\pi}{2T_b}t) \quad \cos(2\pi f_c t)$$

$$\phi_2(t) = \sqrt{\frac{2}{T_b}} \quad \sin(\frac{\pi}{2T_b}t) \quad \sin(2\pi f_c t)$$

$$\phi_3(t) = \sqrt{\frac{2}{T_b}} \quad \cos(\frac{\pi}{2T_b}t) \quad \sin(2\pi f_c t)$$

$$\phi_4(t) = \sqrt{\frac{2}{T_b}} \quad \sin(\frac{\pi}{2T_b}t) \quad \cos(2\pi f_c t)$$

METHOD, HARDWARE PRODUCT, AND COMPUTER PROGRAM PRODUCT FOR PERFORMING HIGH DATA RATE WIRELESS TRANSMISSION

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

The present invention generally relates to data multiplexing, and more particularly, to methods, hardware products, and computer program products for performing high data rate wireless transmission.

2. Description of Background

In order to achieve wireless transmission of large signals exceeding one gigabit per second, Shannon's Theorem dictates that it is necessary to increase the bandwidth or raise the power per bit relative to signals which do not exceed one gigabit per second. At the same time, high frequency circuits for performing high-speed signal processing, particularly analog to digital converters (ADCs) and digital to analog converters (DACs), are generally expensive and have difficulty functioning with accuracy. Furthermore, depending on the modulation method, the impact of phase noise of the circuit configuration components cannot be ignored, making it impossible to produce effective speeds. This is particularly the case in methods for multilevel modulation of the amplitude direction. Accordingly, for the realization of high-speed high-capacity wireless transmission, a new multiplexing method that is efficient in its use of frequencies, does not create multiple values in the amplitude direction, and is resistant against circuit phase noise is needed. If these problems are resolved, it will be possible to realize a circuit configuration that can be produced at low cost.

A modulation method generally known to those of ordinary skill in the relevant art is Orthogonal MSK (OMSK). OMSK is known to be highly efficient in terms of frequency use. With reference to FIG. 1, in an orthogonally-multiplexed OMSK system 100, with the demodulation method that is generally suggested, orthogonal demodulation on the IQ plane is the base, and it is obtained on a transmitting side by preparing and mixing 4 different frequencies including a first frequency 101, a second frequency 102, a third frequency 103, and a fourth frequency 104. However, with this technique, it is necessary to provide a corresponding frequency set that includes four different frequencies on a receiving side.

In order to restore the phase rotation that arises due to the fact that the frequencies cannot be exactly the same on the transmitting side and receiving sides, it is necessary to use ADCs to perform over sampling and phase recovery. In other words, four ADCs are necessary and the circuit configuration on the receiving side becomes complex and costly. On the other hand, in the case of MSK modulation, the difference between the high frequency component and the low frequency component is exactly half the symbol rate. This fact is utilized in the configuration of FIG. 2 wherein it is possible to generate a clock signal 203 comprising a symbol rate from a received signal 201, but in such a case it is necessary to generate double the frequency, and for Gbps data rates, the impact on the circuit is large. Thus, a more simple and convenient circuit configuration is needed that can transmit and receive OMSK efficiently at high frequencies.

SUMMARY OF THE INVENTION

A method for performing high data rate wireless transmission and reception transmits minimum shift-keyed (MSK) data by multiplexing a first MSK data stream and a second MSK data stream wherein the first MSK data stream is 90-degree phase-shifted with respect to the second MSK data stream. The transmitted MSK data is received by performing phase recovery and demodulation using an FM discriminator having a demodulation circuit for implementing a 45-degree phase shift prior to demodulation.

Hardware products and computer program products corresponding to the above-summarized methods are also described and claimed herein. Other methods, hardware products and/or computer program products according to embodiments will be or become apparent to one with skill in the art upon review of the following drawings and detailed description. It is intended that all such additional methods, hardware products, and/or computer program products be included within this description, be within the scope of the present invention, and be protected by the accompanying claims.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Disclosed herein is a modulation method that multiplexes two minimum shift keyed (MSK) data streams that are 90-degree phase-shifted. This MSK modulation method enables simple and low-cost receiving circuitry by utilizing a demodulation method that incorporates an FM discriminator, without using an expensive analog to digital converter (ADC) or digital to analog converter (DAC). Moreover, by performing differential encoding in conjunction with transmitting the MSK data, the receiving circuitry can be simplified further.

Figure 3B:
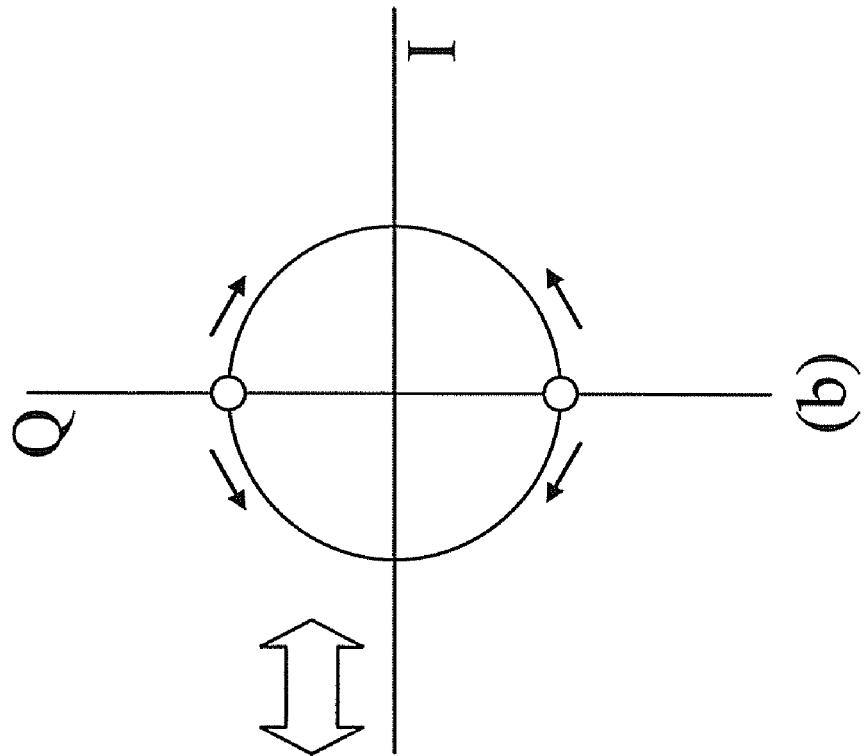
FIGS. 3A and 3B comprise illustrative diagrammatic representations showing constellations for an exemplary MSK modulation system.
Figure 3A:
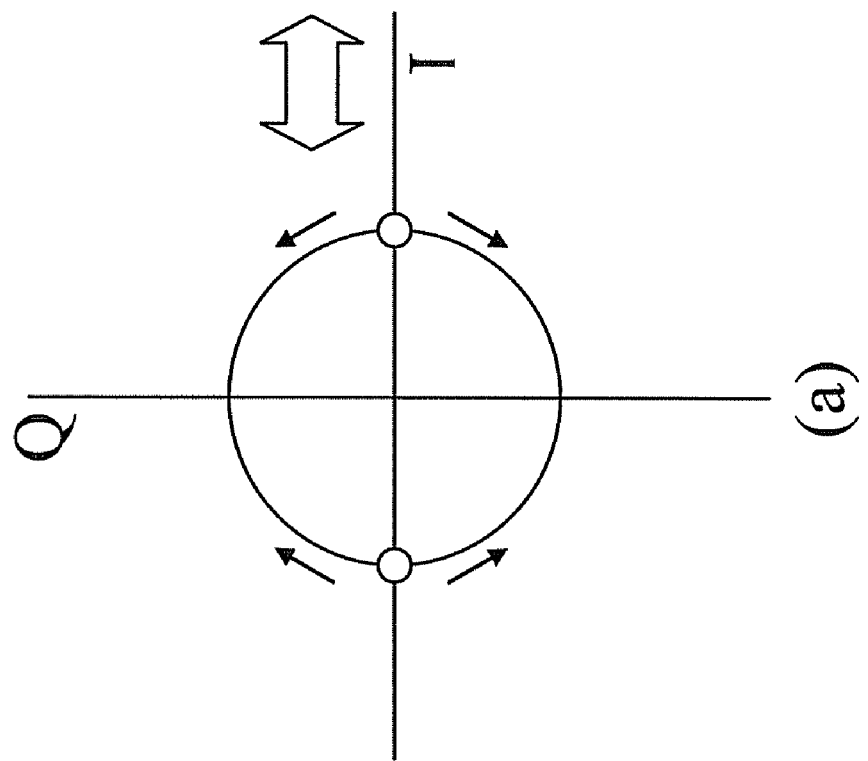

MSK modulation methods may be employed to implement special cases of FSI modulation as follows. A first frequency and a second frequency are used wherein the difference between the two frequencies used is $1/(2T)$, and where the data rate is T (=the time to transmit 1 symbol). At this time, the phases of the two frequencies are sequential. This is shown in the illustrative constellations of FIGS. 3A and 3B. FIG. 3A shows an illustrative constellation when I is 1 or −1, and FIG. 3B shows the illustrative constellation of FIG. 3A where Q is 1 or −1. The MSK modulation method, when viewed on the IQ plane, has 4 points (1,0), (0,1), (−1,0), (0,−1), and at the instant of time T it is positioned at one of these 4 points. Since the MSK modulation method is a special case of the FSI modulation method, from each constellation position, depending on whether the next data is 1 or 0, it will rotate sequentially in a clockwise or anticlockwise direction. Accordingly, when this is viewed according to the time of each data rate, by going back and forth between the states in FIGS. 3A and 3B, it becomes a trajectory on the constellation.

Since the amplitude is fixed, the trajectory draws a substantially exact circumference on the IQ plane. In order to draw this kind of trajectory, it is necessary for the I and Q data to move a half cycle apart. This can be expressed by the following formula:

$$s(t)=a_I(t)\cos(\pi t/2T)\cos(2\pi f_c)+a_Q(t)\sin(2\pi t/2T)\sin(2\pi f_c)$$ (Formula 1)

Figure 4:
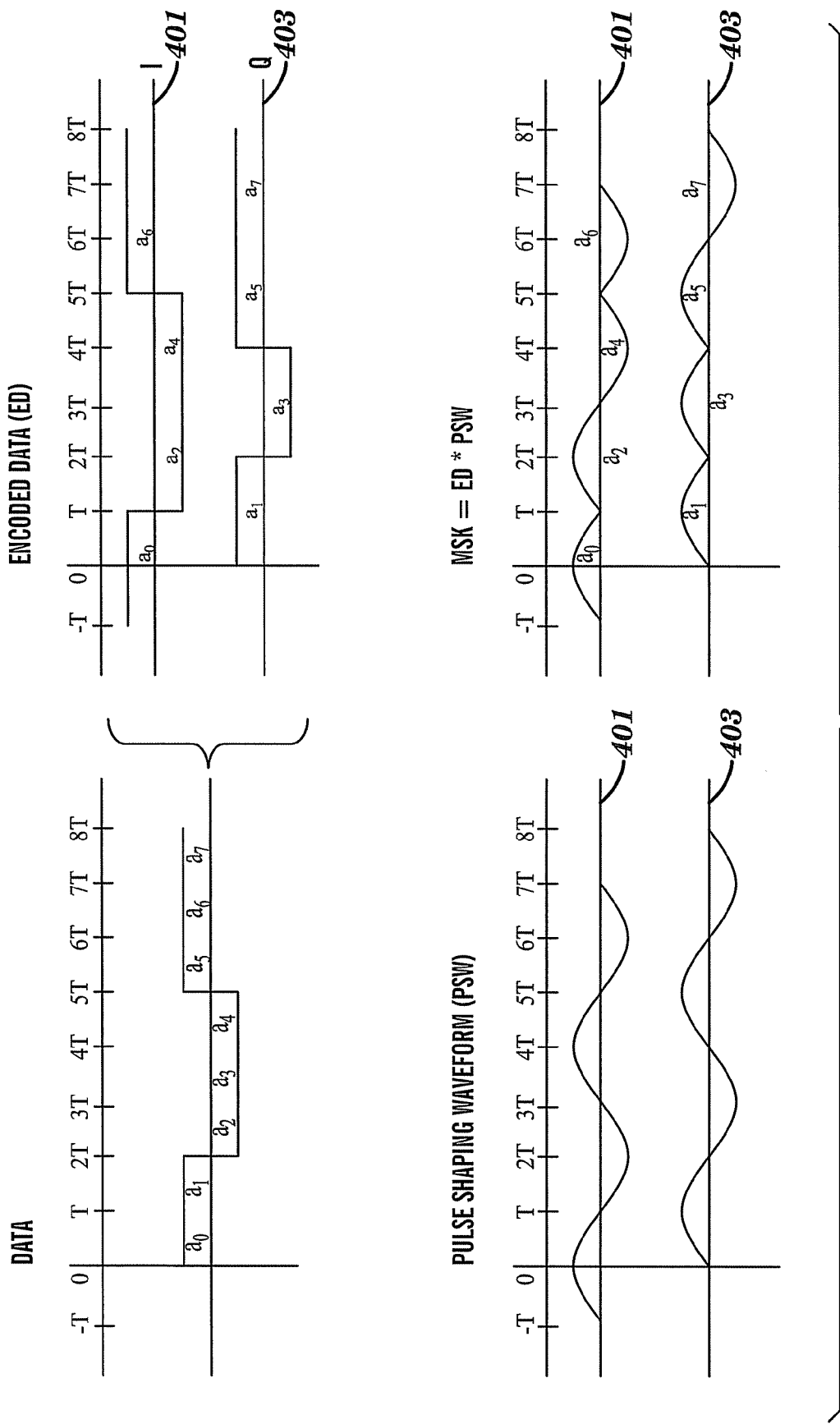
FIG. 4 is a set of waveform diagrams showing formation of an MSK-modulated data stream.

Here, s(t) is the signal to be transmitted, $a_I(t)$ and $a_Q(t)$ are the binary data for I and Q (1 or −1), and $f_c$ is the carrier frequency. The waveforms of $a_I(t)$ and $a_Q(t)$ are related to $\cos(\pi t/2T)$ and $\sin(\pi t/2T)$ as shown in FIG. 3. That is, I and Q data, which are apart by a half cycle T, are changing, and this change is synchronous with the corresponding $\cos(\pi t/2T)$ and $\sin(\pi t/2T)$. An MSK I signal 401 and an MSK Q signal 403 in FIG. 4 correspond, respectively, to the first term and second term of Formula 1. When these terms are added together, they become s(t) of Formula 1. S(t) can be converted into Formula 2 using the rules of trigonometric functions.

$$s(t)=\cos(2\pi f_c+c_k(t)\pi t/2T)$$ (Formula 2)

Here, $+c_k(t)$ is $-a_I(t)a_Q(t)$. In other words, this is defined so that when $a_I(t)$ and $a_Q(t)$ are the same symbols, $c_k(t)$ is −1, when they are different symbols, it is 1.

Figure 5:
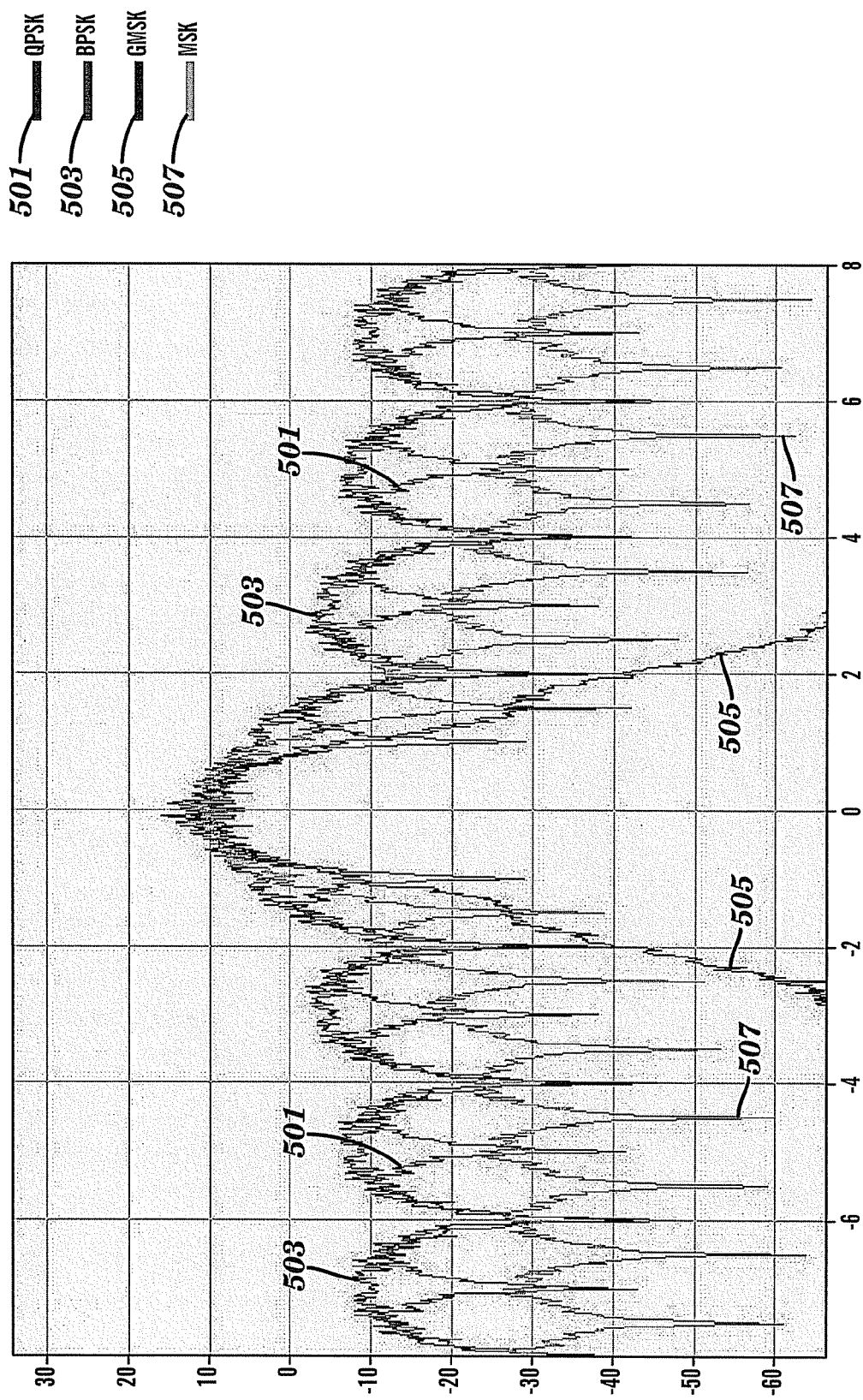
FIG. 5 is a plot of magnitude versus frequency for a set of illustrative transmitted shift-keyed data signals.

Accordingly, when $c_k(t)$ is 1 or −1, this corresponds to when each of the frequencies are the carriers $f_c+1/(4T)$ and $f_c-(\frac{1}{4}T)$. It can be seen for s(t), which is a synthesized signal, that in response to the data, it has selected high frequency and low frequency waves separated by exactly $1/(2T)$, centered on the difference as the carrier frequency. It can also be seen that the phases are sequential. In other words, it is evident that this modulation method has a highly efficient frequency use. FIG. 5 shows the spectra of each type of modulation method including quadrature phase shift keying (QPSK) 501, BPSK 503, GMSK 505, and MSK 507. The size of the main lobe is bigger in MSK 507 than QPSK 501, but the side lobe is dramatically smaller, and looking at the 90% energy range, it is evident that MSK is an extremely efficient modulation method.

Figure 6:
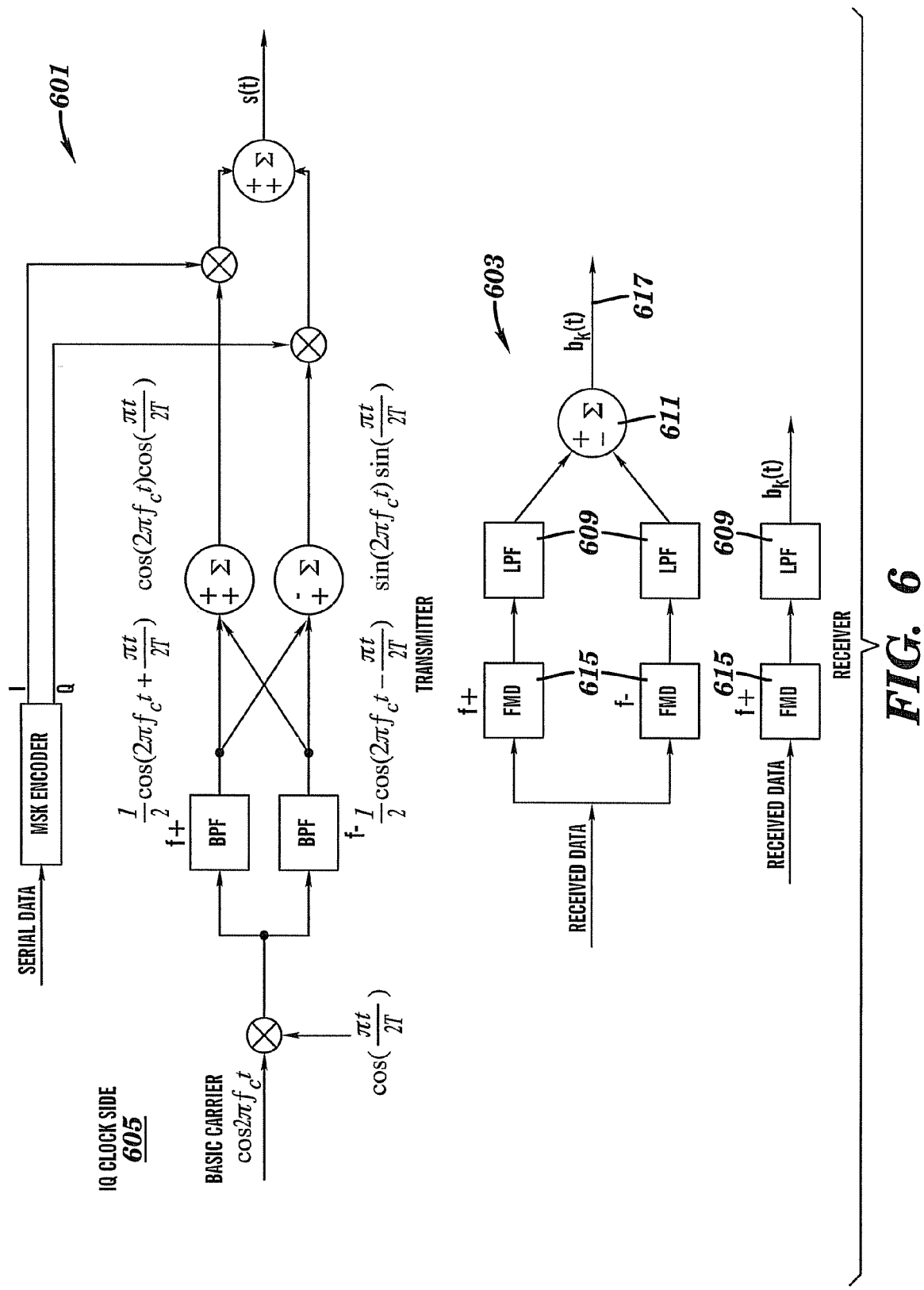
FIG. 6 is a hardware block diagram showing illustrative MSK receiver and transmitter circuitry.

FIG. 6 is a hardware block diagram showing illustrative MSK receiver circuitry 603 and transmitter circuitry 601. Using an FM discriminator FMD 615 when receiving the signal that has been MSK modulated enables simplification of the circuit and easy implementation. In other words, with the FMD 615, it is possible to select one high frequency component from a plurality of high frequency components represented in Formula 2, and one low frequency component from a plurality of low frequency components represented in Formula 2. In the transmitter circuitry 601 of FIG. 6, pulse shaping waves ($\cos(\pi t/2T)$ and $\sin(\pi t/2T)$ in Formula 1) are generated at an IQ clock side 605 and switched according to the IQ input symbols into which they have been encoded. At the receiver circuitry 603, by using the FMD 615, only the high frequency components selected by the $c_k(t)$ symbol in Formula 2 are passed through a filter formed by low pass filters 609 and a summer 611. The summer 611 has a non-inverting input and an inverting input. Thus, an output 617 on the receiving side is on-off keying (0 or 1) and the value corresponds to $c_k(t)$. In other words, when $c_k(t)$ is 1, the output is 1, and when $c_k(t)$ is −1, it is 0. One can either encode this relationship at the transmitting side or decode it at the receiving side. Thus, with the MSK modulation method it is possible to configure the circuit without requiring an ADC at the receiving side, and complex circuit configuration such as in other amplitude multilevel modulation or QPSK modulation is unnecessary. Integration into a small area thereby enables low-cost production.

Next, the OMSK modulation method disclosed herein will be explained. With respect to Formula 2, the waveform derived from the following Formula 3 is orthogonal to Formula 2. Even if these signal waveforms expressed by Formula 2 and Formula 3 are combined, by performing orthogonal demodulation, it is possible to separate them completely. At this time the frequency use efficiency is exactly the same as the MSK modulation method, and it is possible to transmit two bits per symbol, which is twice the MSK modulation method.

$$s'(t)=\sin(2\pi f_c + c'_k(t)\pi t/2T) \quad \text{(Formula 3)}$$

In order to generate the signal waveform in Formula 3 it is necessary for the baseband component to be as in Formula 4.

$$s'(t)=b_I(t)\sin(\pi t/2T)\cos(2\pi f_c)-b_Q(t)\cos(\pi t/2T)\sin(2\pi f_c) \quad \text{(Formula 4)}$$

Figure 7:
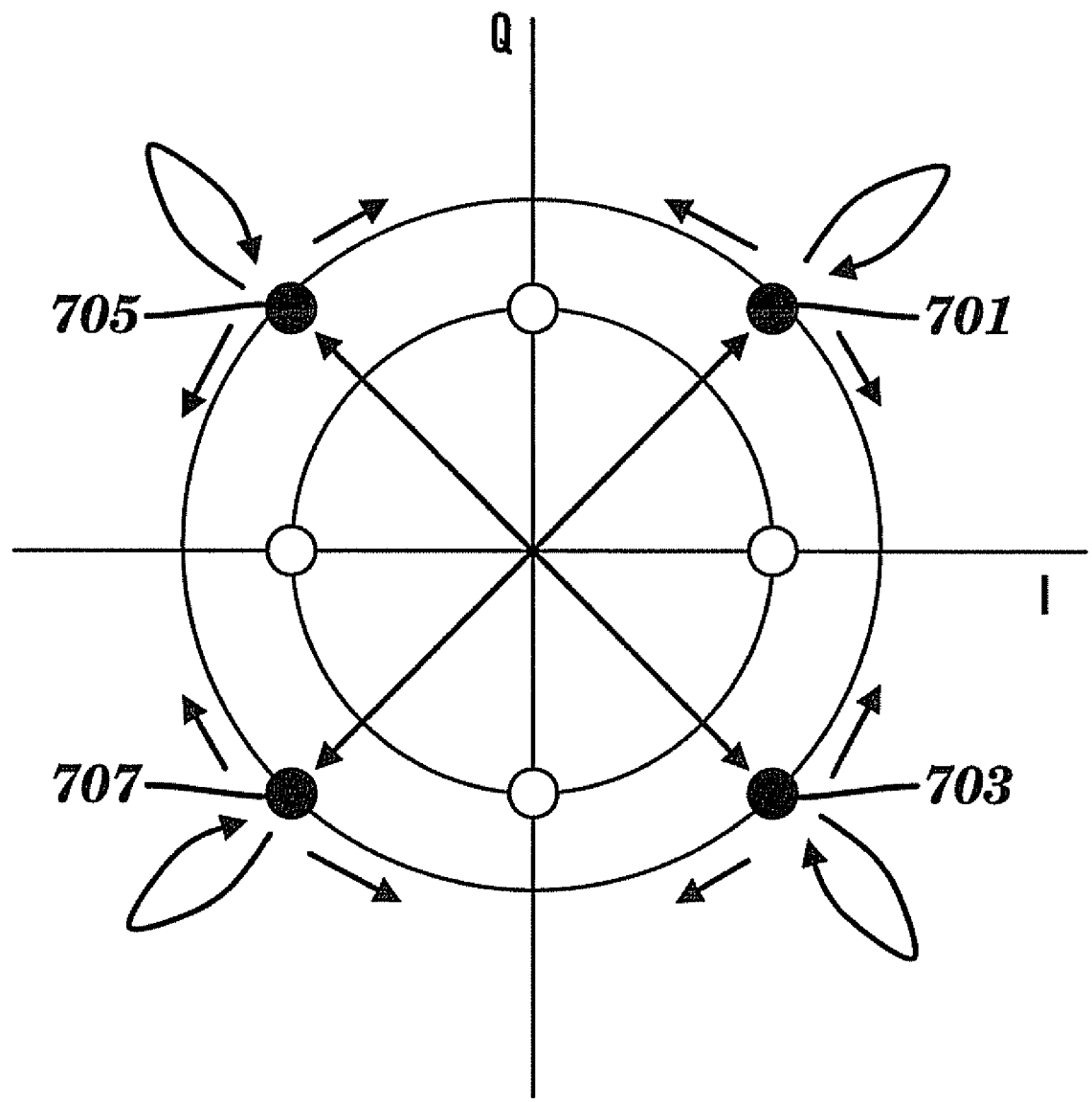
FIG. 7 illustrates an exemplary orthogonal MSK (OMSK) signal constellation.

If the symbols of $b_I(t)$ and $b_Q(t)$ are the same, $c'_k(t)$ gives −1, if they are different it gives 1. $b_I(t)$ and $b_Q(t)$ can be given as digital baseband signals. The constellation at this time becomes as shown in FIG. 7. A set of constellation points 701, 703, 705, 707 are the same as in QPSK but the trajectory is completely different. In particular, even when stopping at the same point, the values of I and Q fluctuate so that their values interchange with each other. This can be understood when overlaying the constellation of the MSK modulation method in FIG. 3 with a constellation that has been orthogonalized 90 degrees.

Figure 2:
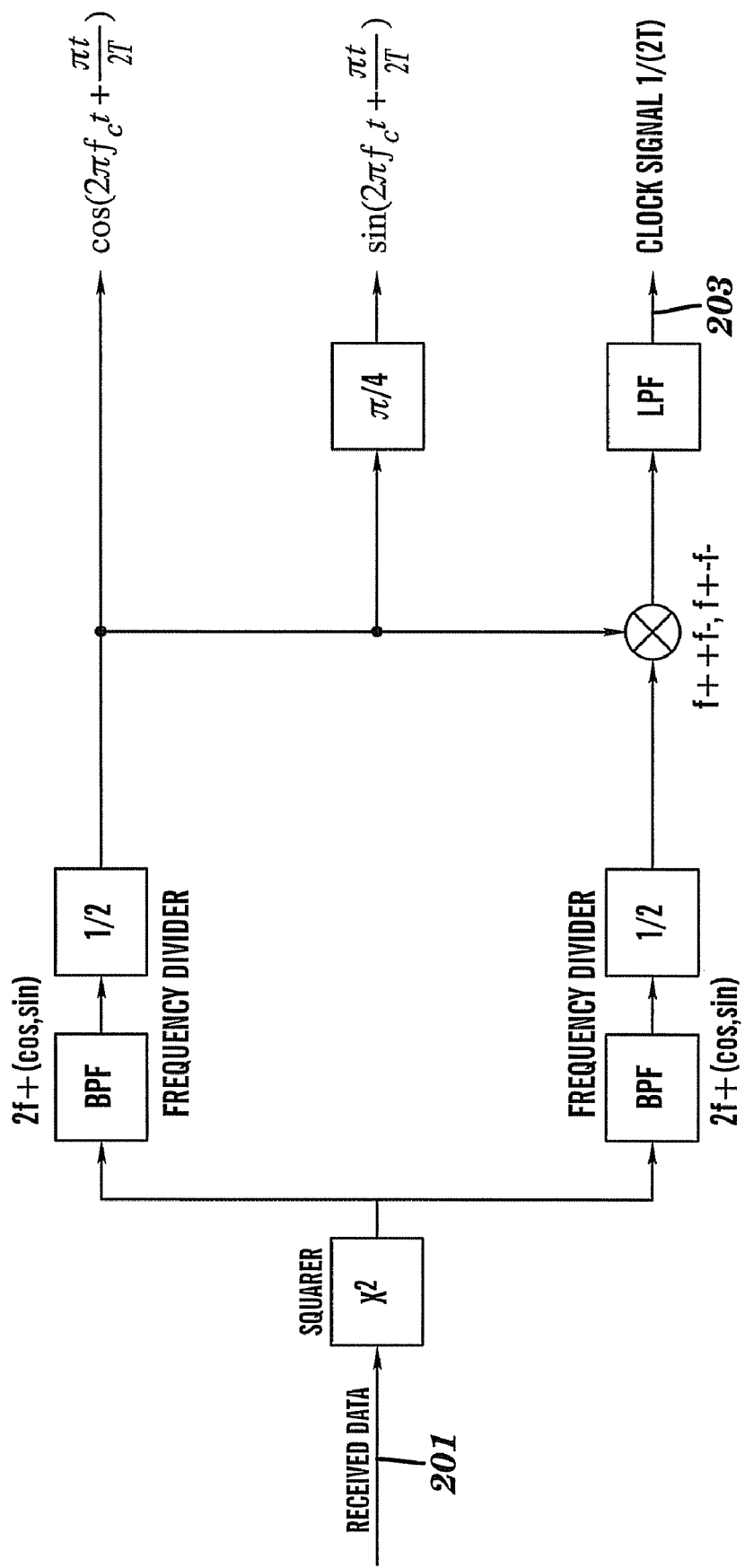
FIG. 2 is a block diagram setting forth a prior art clock recovery circuit for use with the circuit of FIG. 1.
Figure 8:
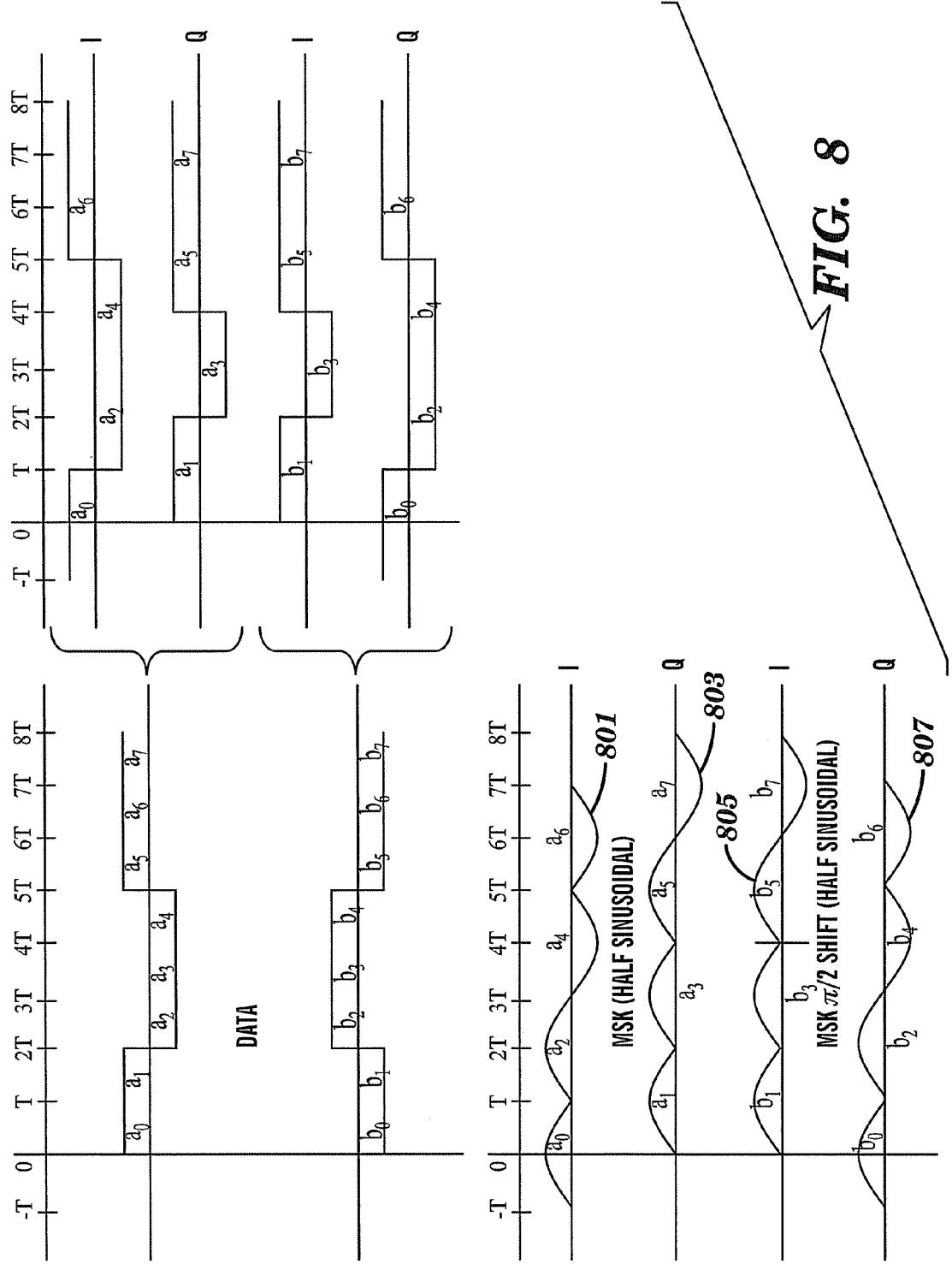
FIG. 8 is a set of waveform diagrams showing formation of a baseband signal in OMSK.

Baseband signals can also be created using the same operations as in FIG. 2. This is shown in FIG. 8 which displays a set of waveform diagrams showing formation of a baseband signal in OMSK. In terms of the operations that have been performed in FIG. 2, using a plurality of pulse shaping waves 801, 803, 805, 807 wherein a first set of waves 801, 803 are shifted by 90 degrees with respect to a second set of waves 805, 807, it is possible to perform 90 degree shifted MSK modulation and synthesize with the original MSK modulation.

Figure 9:
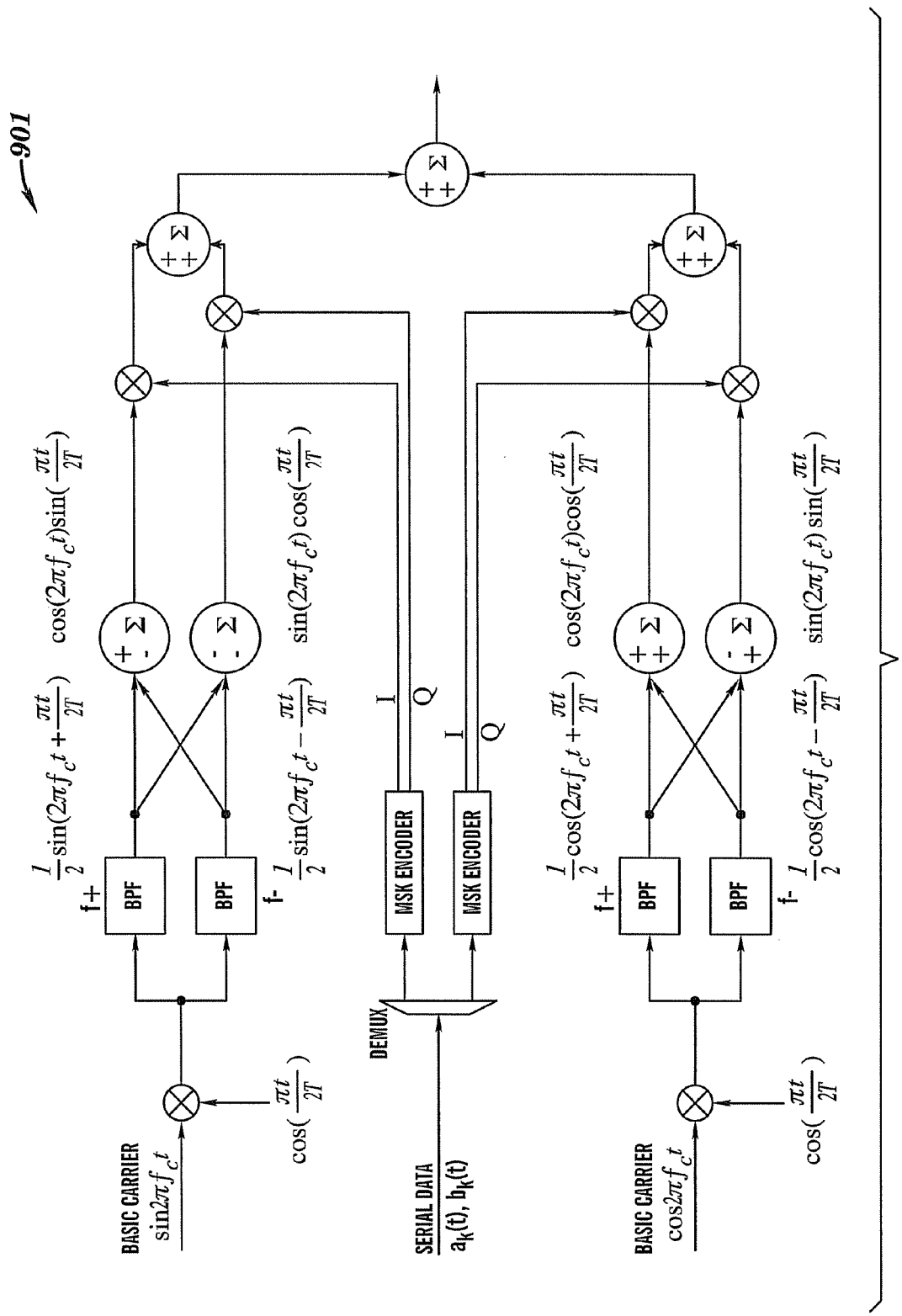
FIG. 9 is a hardware block diagram showing a first illustrative example of a transmitting circuit for OMSK.

FIG. 9 shows an illustrative example of a transmitting circuit 901 using any of the methods disclosed herein. Signals to be transmitted are denoted as $a_k(t)$ and $b_k(t)$, and the signals to be received are signals that change the −1 of $c_k(t)$ and $c'_k(t)$ to 0. Thus this fulfils the relationship in Formula 5:

$$\begin{cases} c_k(t) = -a_k(t)a_{k+1}(t) \\ c'_k(t) = -b_k(t)b_{k+1}(t) \end{cases} \quad \text{(Formula 5)}$$

Accordingly, with an MSK encoder, if $d_k(t)$ exists as data, by deciding on the appropriate initial values $a_0(t)$ and $b_0(t)$, while allocating $d_k(t)$ alternately into 2 (demux in FIG. 9) the following encoding can be performed:

$$\begin{cases} a_{k+1}(t) = -d'_k(t)a_k(t) \\ b_{k+1}(t) = -d''_k(t)b_k(t) \end{cases} \quad \text{(Formula 6)}$$

However, $d'_k(t)$ and $d''_k(t)$ are data time-series formed by alternately allocating $d_k(t)$ into 2. By encoding in this way, through multiplexing $c_k(t)$ and $c'_k(t)$ at the receiving side, the original data $d_k(t)$ can be received.

Of course the original data is in digital values of 0 or 1, so it is necessary to convert this. Further, one may perform decoding at the receiving side instead of performing these encodings. In other words, one may keep $d'_k(t)$ and $d''_k(t)$ which have been formed by alternately allocating the data $d_k(t)$ into 2 at the transmitting side in the same state, as $a_k(t)$ and $b_k(t)$. In this case, at the receiving side, as long as the initial values are decided, it is possible to calculate the original data $d'_k(t)$ and $d''_k(t)$ using Formula 5 from $c_k(t)$ and $c'_k(t)$ that have been obtained.

Figure 10:
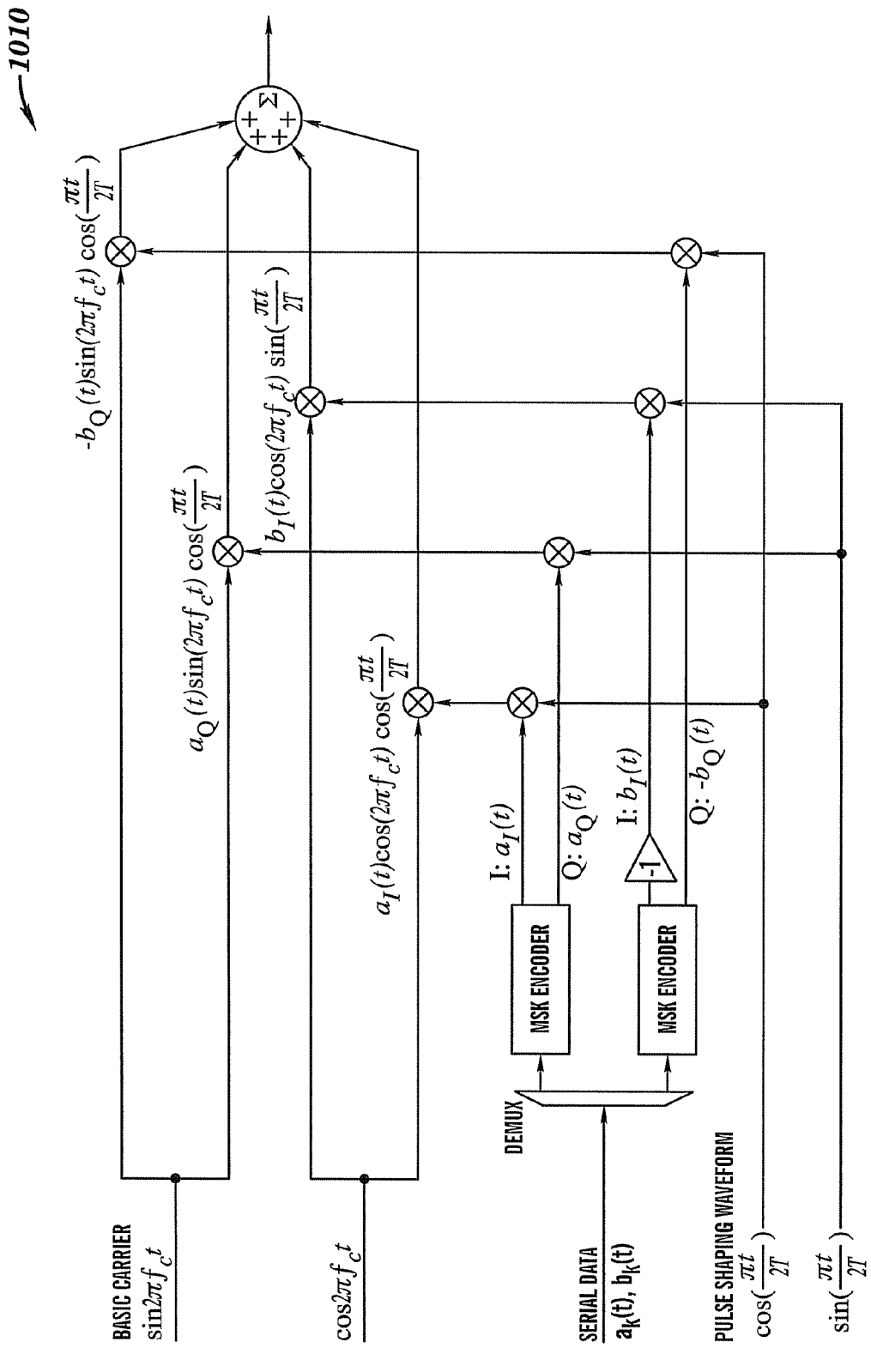
FIG. 10 is a hardware block diagram showing a second illustrative example of a transmitting circuit for OMSK.

Apart from the transmitting circuit 901 shown in FIG. 9, it is also possible to conceive of a configuration 1010 as in FIG. 10. In FIG. 9, in order to generate the pulse shaping waves 801, 803, 805, 807 of FIG. 8, the basic carrier is multiplied by $\cos(\pi t/(2T))$, but it is possible to perform this at the baseband side and instead of switching digitally, it can be achieved by performing switching on the pulse-shaped waveform. In this case as well, encoding of the baseband signal can either be done via the method of encoding at the transmitting side and directly receiving data at the receiving side, or the method of decoding at the receiving side to return it to the correct data.

Figure 1:
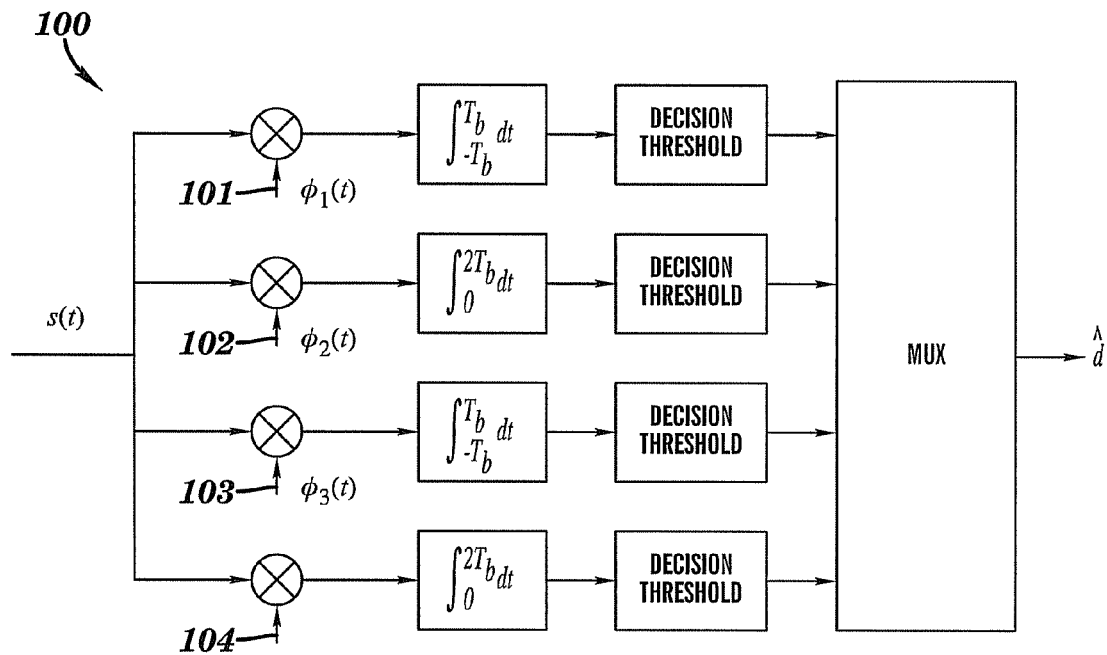
FIG. 1 is a block diagram setting forth a prior art circuit for receiving minimum shift-keyed (MSK) data.
Figure 11:
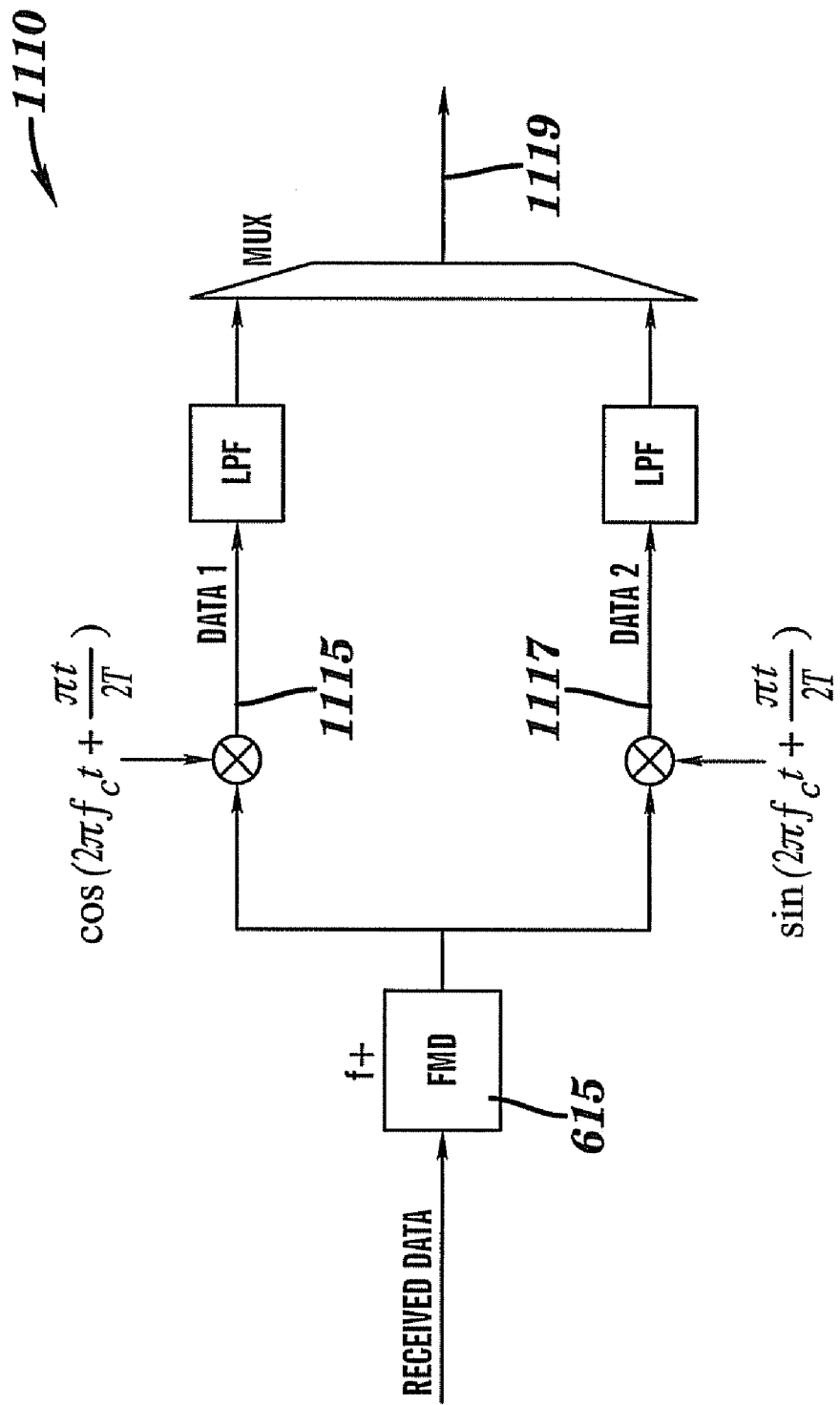
FIG. 11 is a hardware block diagram showing an illustrative example of a receiving circuit for OMSK.

FIG. 11 is a hardware block diagram showing an illustrative example of a receiving circuit 1110 for OMSK. Receiving circuit 1110 differs from receiver circuitry 603 of FIG. 6 in that receiving circuit 1110 has orthogonal demodulation added thereto. By extracting a sine component 1117 and a cosine component 1115 in the high frequency signal that is the output of the FM discriminator FMD 615, this output becomes the signals corresponding to $c_k(t)$ and $c'_k(t)$ in the formula, and by turning these into the digital values 0 or 1, they can be received as correct information. Since an output of the receiving circuit 1119 becomes serial data in 0s or 1s, the output can be transferred in that state to a digital baseband processing circuit which may be located at a subsequent stage. Compared to the prior art shown in FIG. 1, this arises due to the difference in how the data to be transmitted is encoded. In other words, there is a question of whether to map the data to the IQ of the digital baseband, or whether to map the data to the high and low frequencies after modulation. In the former case, it is necessary to provide four different frequencies at the receiving side, and phase recovery needs to be performed for each, thereby making the configuration of the receiver extremely complex as well as potentially inaccurate. On the other hand in the latter case, only two different frequencies are necessary and demodulation using an FM discriminator can be performed. Further, since an ADC is unnecessary, it is possible to configure a simple receiver.

Although symbol rate recovery can be performed by equipping the output of a receiving circuit with a pair of analog to digital converters (ADCs) 1201, 1203 as in the prior art (FIG. 12A), by performing symbol rate recovery with circuitry that uses a PLL known as a Clock Data Recovery (CDR) 1204, 1206 (FIG. 12B) pursuant to the techniques disclosed herein, the ADCs 1201, 1203 are rendered unnecessary. If there is a sufficient amplitude and transition number, a configuration using CDRs 1204, 1206 can be performed more simply. In this diagram, the outputs from two orthogonal frequencies are multiplexed by a mux 1205 and then outputted, but it is also possible to output them in a parallel state. The transition number is necessary for the PLL in the CDRs 1204, 1206 to lock, and this becomes possible by appropriately scrambling the information data in the transmitting side.

Figure 12A:
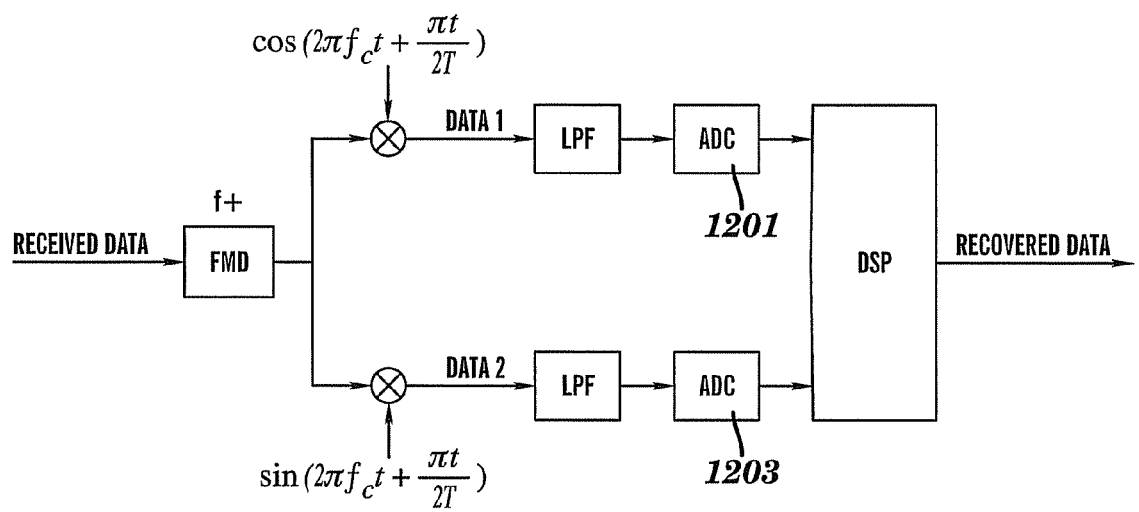
FIG. 12A is a hardware block diagram showing an illustrative prior art configuration for symbol rate recovery.
Figure 12B:
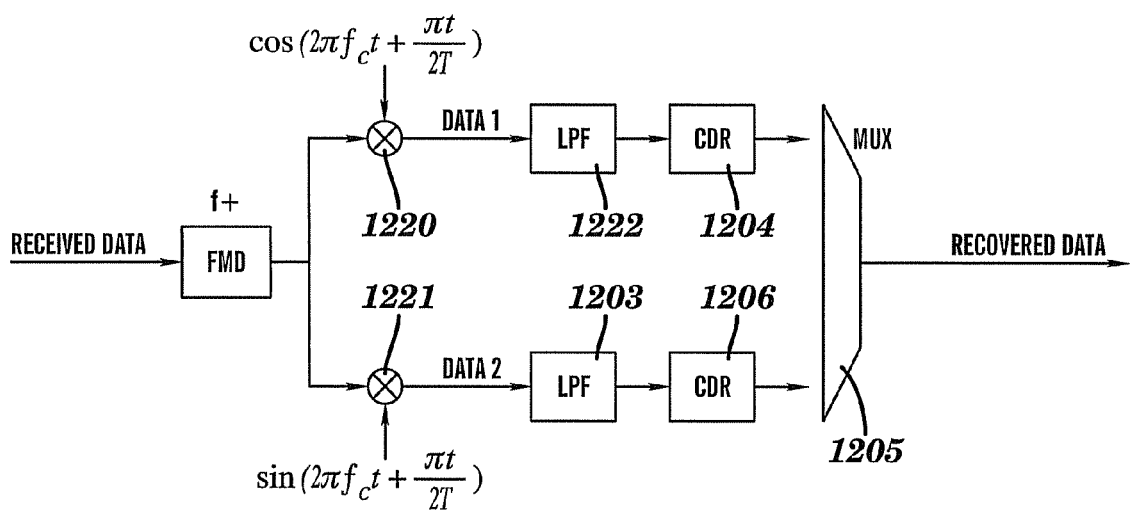
FIG. 12B is a hardware block diagram showing an illustrative configuration for symbol rate recovery designed according to the techniques disclosed herein.

As stated with regard to the receiving circuit 1110 (FIG. 11), data rate recovery from the carrier becomes hard to achieve when the carrier is at a high frequency. In other words, when sending and receiving at a data rate of several Gbps, the frequency necessary for orthogonal demodulation uses an oscillator on the receiving circuit side. However, in this case, even if the frequency is the same as the clock on the transmitting side, there will always be a small discrepancy, and this gap will grow larger with time, making it necessary to provide a mechanism for aligning the phases. Generally, as shown in FIG. 12A, oversampling is performed with ADCs 1201, 1203 and synchronization occurs while constantly detecting the data that indicates the header. However, with the techniques disclosed herein, the expensive ultra-high speed ADCs 1201, 1203 are not necessary. Moreover, these ADCs 1201, 1203 require a substantial amount of resolution which is difficult to achieve. On the other hand, with the configuration based on CDRs 1204, 1206 as shown in FIG. 12B, no suitable method presently exists for providing recovery with the orthogonal frequency in a phase-shifted state. Therefore, we propose a method for receiving data detecting where the phases are in step by providing an orthogonal demodulator with the clock phase shifted 45 degrees in advance and receiving data parallel to the phase direction.

Figure 13:
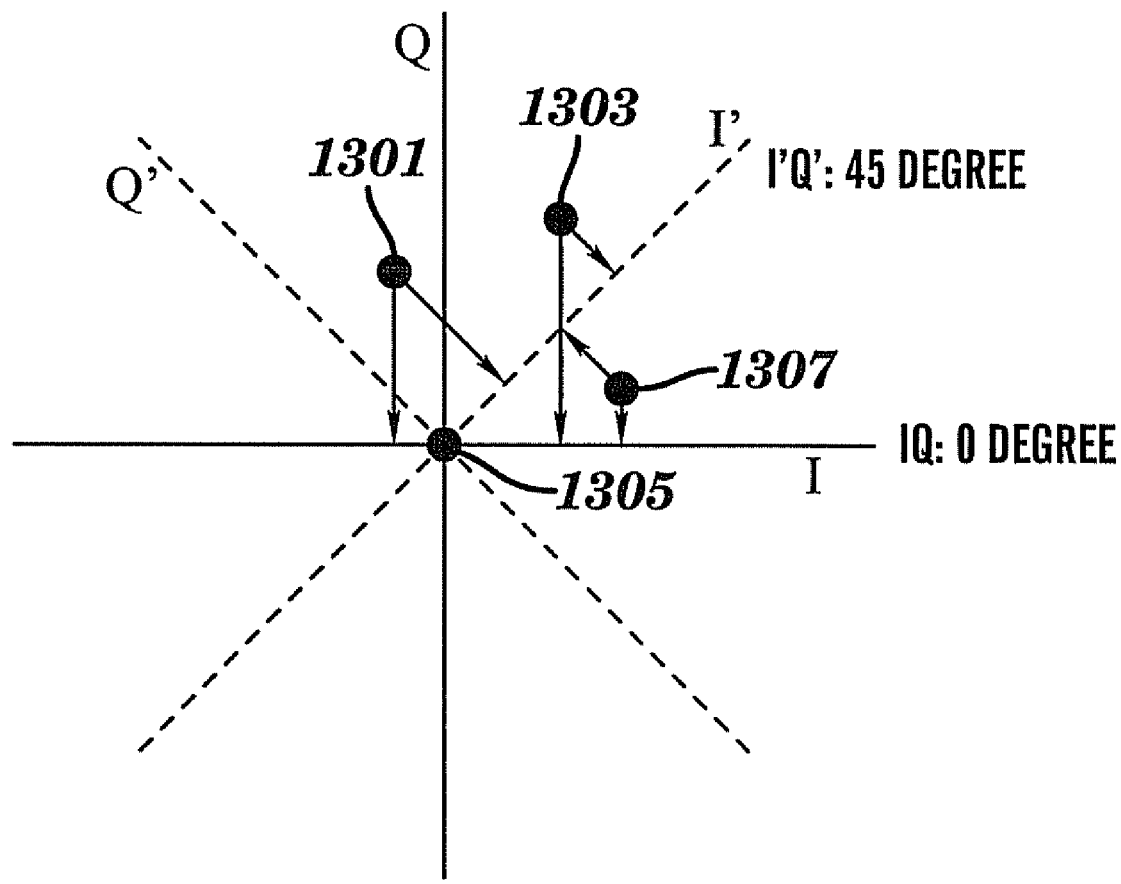
FIG. 13 illustrates an exemplary constellation showing in-phase/quadrature (I/Q) space wherein orthogonal demodulators are employed to phase shift received data by 45 degrees in advance of the received data being demodulated.
Figure 14A:
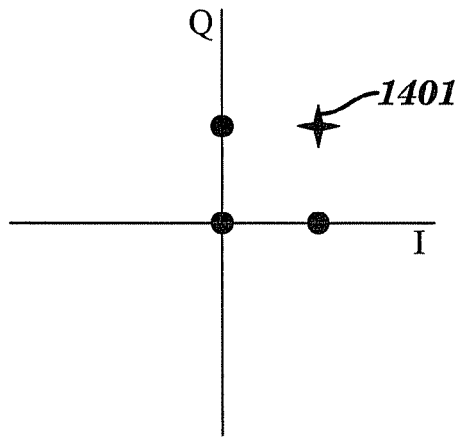
FIGS. 14A-14D show exemplary output constellations in I/Q space using any of the MSK receiving circuits disclosed herein.
Figure 14B:
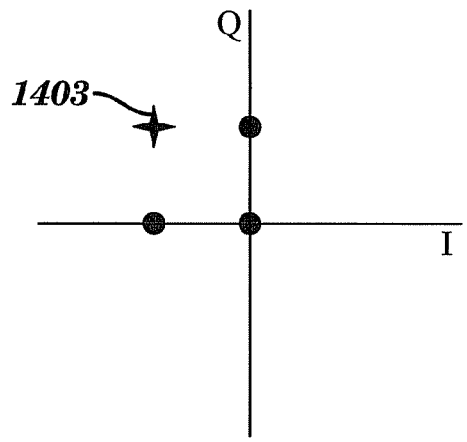
Figure 14C:
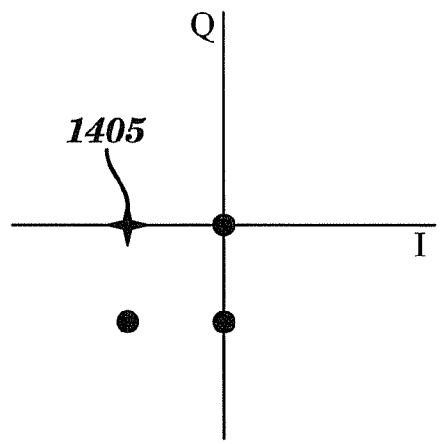
Figure 14D:
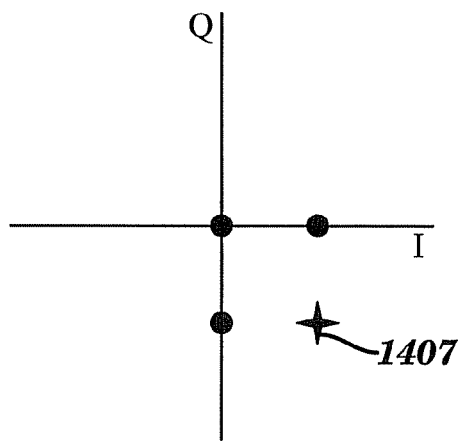

FIG. 13 illustrates an exemplary constellation showing in-phase/quadrature (I/Q) space wherein orthogonal demodulators are employed to phase shift received data by 45 degrees in advance of the received data being demodulated. The IQ plane is the phase of one of the orthogonal demodulators and the I'Q' plane is the phase of the orthogonal demodulator that has been shifted 45 degrees in advance. A set of original constellation points 1301, 1303, 1305, 1307 are shown, but these points are rotated in the I/Q plane of FIG. 13 as desired according to the phases of the orthogonal demodulator. If the determination threshold of 0 and 1 is an intermediate value, by selecting the correct information out of the information obtained from two phase-shifted orthogonal demodulators, it is possible to receive data with near certainty. The two phase-shifted orthogonal demodulators may comprise, for example, a first phase-shifted orthogonal demodulator including a first multiplexer 1220 (FIG. 12B), a first lowpass filter (LPF) 1222, and the CDR 1204, as well as a second orthogonal demodulator including a second multiplexer 1221, a second LPF 1224, and the CDR 1206.

Using any of the orthogonal MSK modulation methods disclosed herein, the original constellation is as shown in FIG. 7, but the FM discriminator output is as shown in FIG. 13, and if synchronization is achieved correctly, the constellation becomes just the first quadrant of the IQ plane. The phases can be shifted as desired up to 360 degrees, but if there are 2 orthogonal demodulators at 0 and 45 degrees, the received data will become one of the scenarios illustrated in FIGS. 14A-D. The phase shift corresponds to the rotation on the constellation, and since it is originally only the first quadrant constellation, when data corresponding to any of the asterisks 1401, 1403, 1405, 1407 in FIGS. 14A-D is received, it is possible to make an immediate decision based on whether the IQ symbols match. In other words, when the data obtained from the two orthogonal demodulators are $(a_I, a_Q)$ and $(a'_I, a'_Q)$, $(a_I, a_Q, a'_I, a'_Q$ may be analog values as desired or digital values −1, 0, 1 through a comparator) determinations may be made so that:

$a_I$ and $a_Q$ symbols match→correct data is $(|a_I|, |a_Q|)$ (|| are absolute values)

$a_I$ and $a_Q$ symbols do not match correct data is $(|a_Q|, |a_I|)$ $a'_I$ and $a'_Q$ symbols match correct data is $(|a'_I|, |a'_Q|)$ $a'_I$ and $a'_Q$ symbols do not match correct data is $(|a'_Q|, |a'_I|)$ If a zero is included in the pairs of received data $(a_I, a_Q)$ or $(a'_I, a'_Q)$ determination is not performed.

Figure 15:
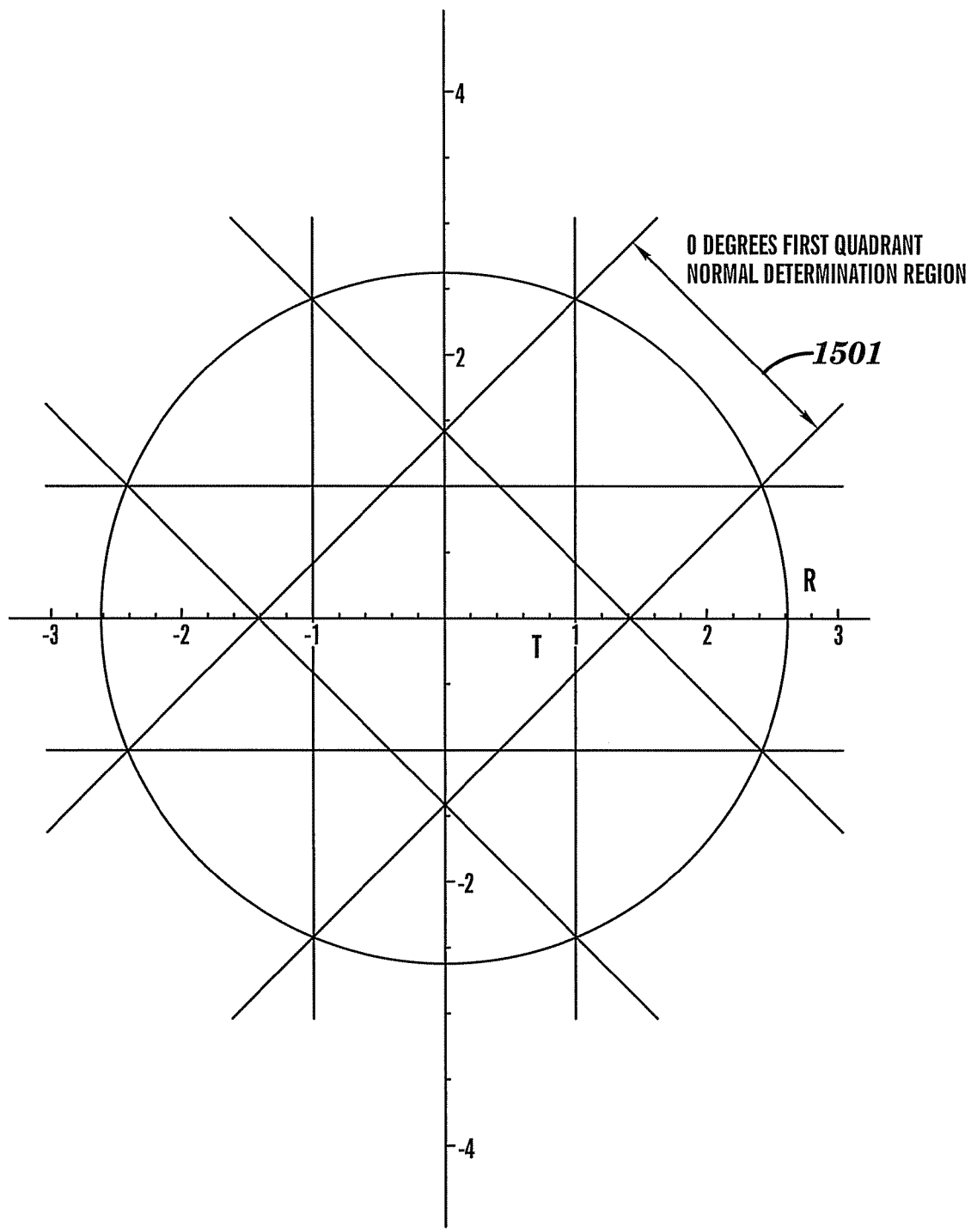
FIG. 15 shows determination threshold values for two orthogonal demodulators in I/Q space with phases shifted by 45 degrees.

In the two orthogonal demodulators shifted 0 degrees and 45 degrees, if they meet the above conditions at the same time in respect of the same data, either data is correct so either can be used. For example, as in FIG. 15, if the threshold is set to approximately 0.38 strength with respect to the maximum amplitude of the constellation, the determination can be made exclusively at the two orthogonal demodulators over a normal determination region 1501 without overlap. These methods do not require a special header or training pattern, and as long as the data has been appropriately scrambled it will always include the asterisk data, so all that is necessary is to detect whether the symbols match for a fixed period of time. Although it will depend on the speed of the phase shift, the fixed time can be achieved even by polling at a frequency much slower than the data rate. Alternatively the symbols can be outputted as data and a determination made by a digital circuit.

Further, by using a header or training pattern, the configuration can be made even simpler. It is also possible to go through a comparator from the start and turn the data into binary digital data (in other words 0 or 1 digital values) before outputting. This is equivalent to outputting values taking the absolute values in the above-mentioned determination. This data can be received with a CDR as digital serial data and determined by digital circuit processing. From the four data values obtained $|a_I|, |a_Q|, |a'_I|, |a'_Q|$, pattern matching is tested with respect to a total of four variations when IQ is received in that state as a pattern, and when it is switched, namely $(|a_I|, |a_Q|), (|a_Q|, |a_I|), (|a'_I|, |a'_Q|),$ and $(|a'_Q|, |a'_I|)$. All that needs to be done is to select the one that matches from these. In actual wireless transmission, due to other restrictions it is common to apply a header or training pattern, so this method is a realistic example that makes use of these.

Figure 16:
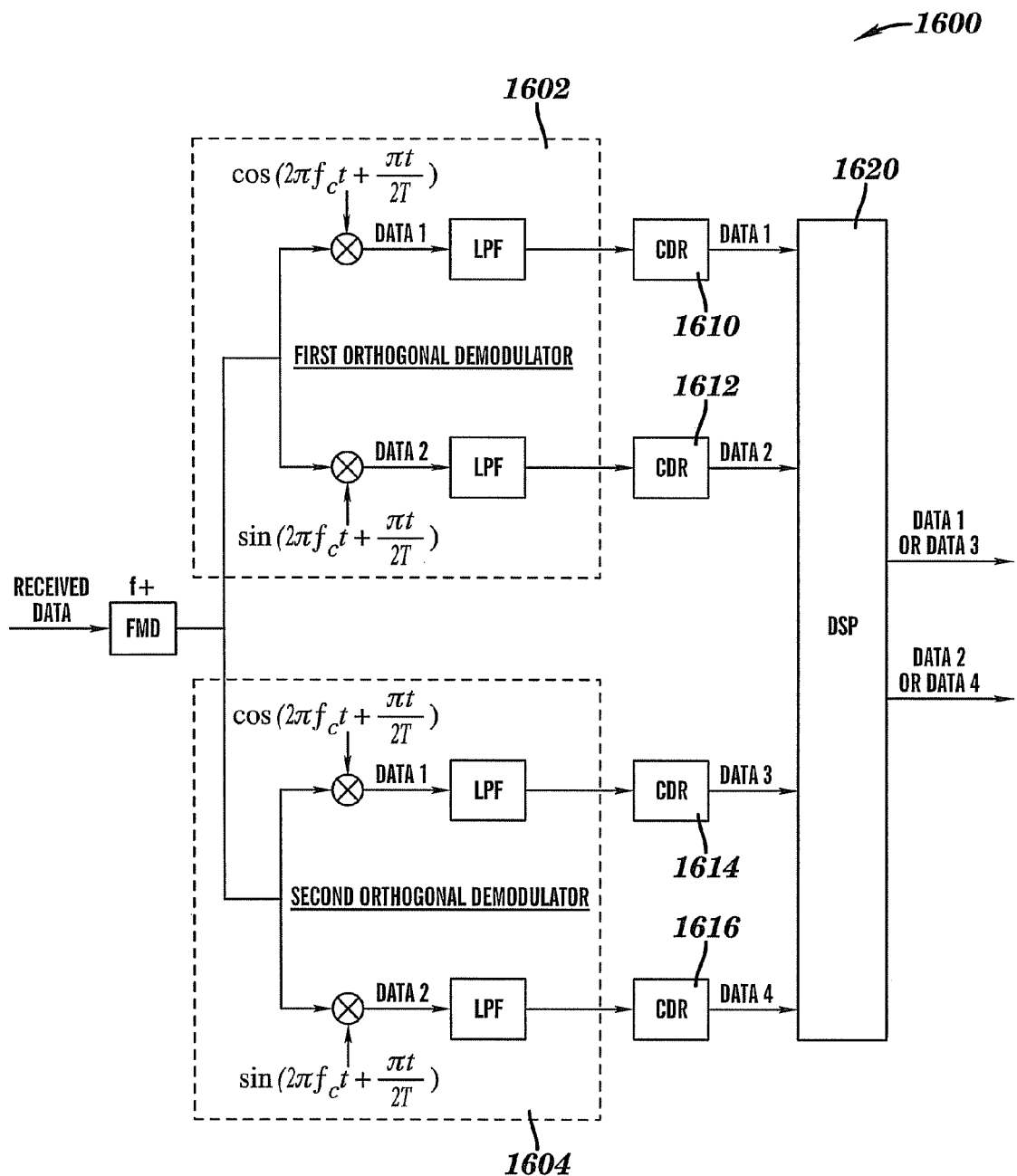
FIG. 16 is a hardware block diagram showing an illustrative example of a receiving circuit with an orthogonal demodulator having a clock shifted by 45 degrees.

FIG. 16 shows an illustrative example of a receiving circuit 1601 for implementing any of the techniques disclosed herein. An output of a first orthogonal demodulator 1602 and an output of a second orthogonal demodulator 1604 are converted into digital values that can be received by a CDR 1610, 1612, 1614, 1616. A DSP 1620 uses digital signal processing and, as described above, with regard to the two sets of IQ data received, data is created that switches I and Q around and pattern matching processing is performed. On the other hand, if the same processing is performed with respect to QPSK, there are four constellations (1,1), (−1,1), (−1,−1), (1,−1). Therefore four types of data must be determined for each orthogonal demodulator 1602, 1604 $(a_I, a_Q), (a_Q, !a_I), (!a_I, !a_Q)$ and $(!a_Q, a_I)$ (! is logical NOT), so it is necessary to perform a total of 8 calculations, making it double the calculation amount of the methods disclosed herein. In this way, by providing two 45 degree phase-shifted orthogonal demodulators, one can appropriately select the correct phase without an AD converter.

Figure 17:
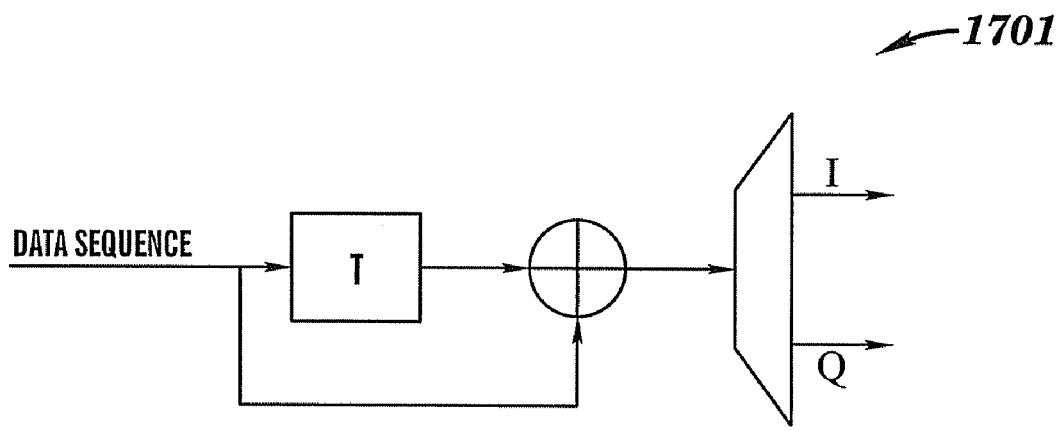
FIG. 17 is a hardware block diagram showing a differentially encoded circuit.

As stated previously, using two orthogonal demodulators with 45 degree phases shifted accurately, one can perform any of the modulation methods disclosed herein which are multiplexed based on MSK modulation, without going through an ADC. In doing so, in the output of each phase-shifted orthogonal demodulator, a determination must be made as to whether to keep the I and Q values as they are or reverse them according to the amount of shift compared to the phase on the transmitting side. On the other hand, at an ultra-high speed data rate the phase shift between the transmitting and receiving side proceeds gradually at a much slower speed, so once the determination is made, that state can be maintained for some time. Accordingly, if information is mapped regarding the difference between I and Q receipt can occur without having to make these determinations. By applying this kind of differential encoding, even if I and Q switch around, data can be received correctly. FIG. 17 shows an illustrative circuit 1701 for differential encoding.

Figure 18:
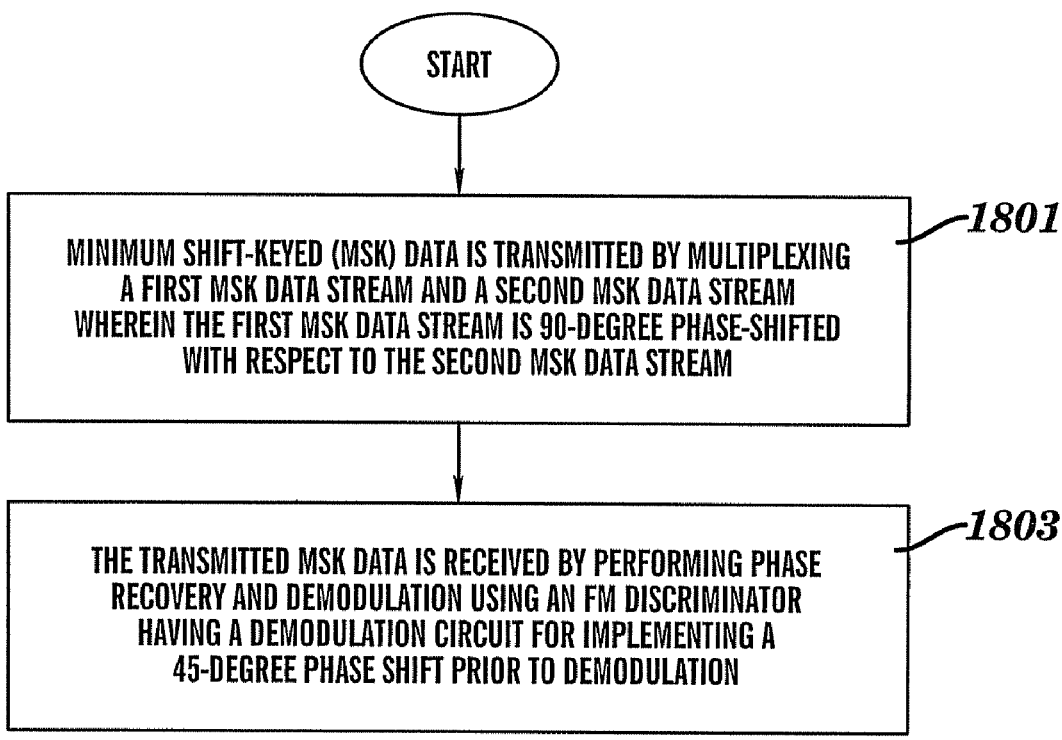
FIG. 18 is a flowchart setting forth an exemplary method for performing high data rate wireless transmission and reception.

FIG. 18 is a flowchart setting forth an exemplary method for performing high data rate wireless transmission and reception. The method commences at block 1801 where minimum shift-keyed (MSK) data is transmitted by multiplexing a first MSK data stream and a second MSK data stream wherein the first MSK data stream is 90-degree phase-shifted with respect to the second MSK data stream. Next, at block 1803, the transmitted MSK data is received by performing phase recovery and demodulation using an FM discriminator having a demodulation circuit that for implementing a 45-degree phase shift prior to demodulation.

Figure 19:
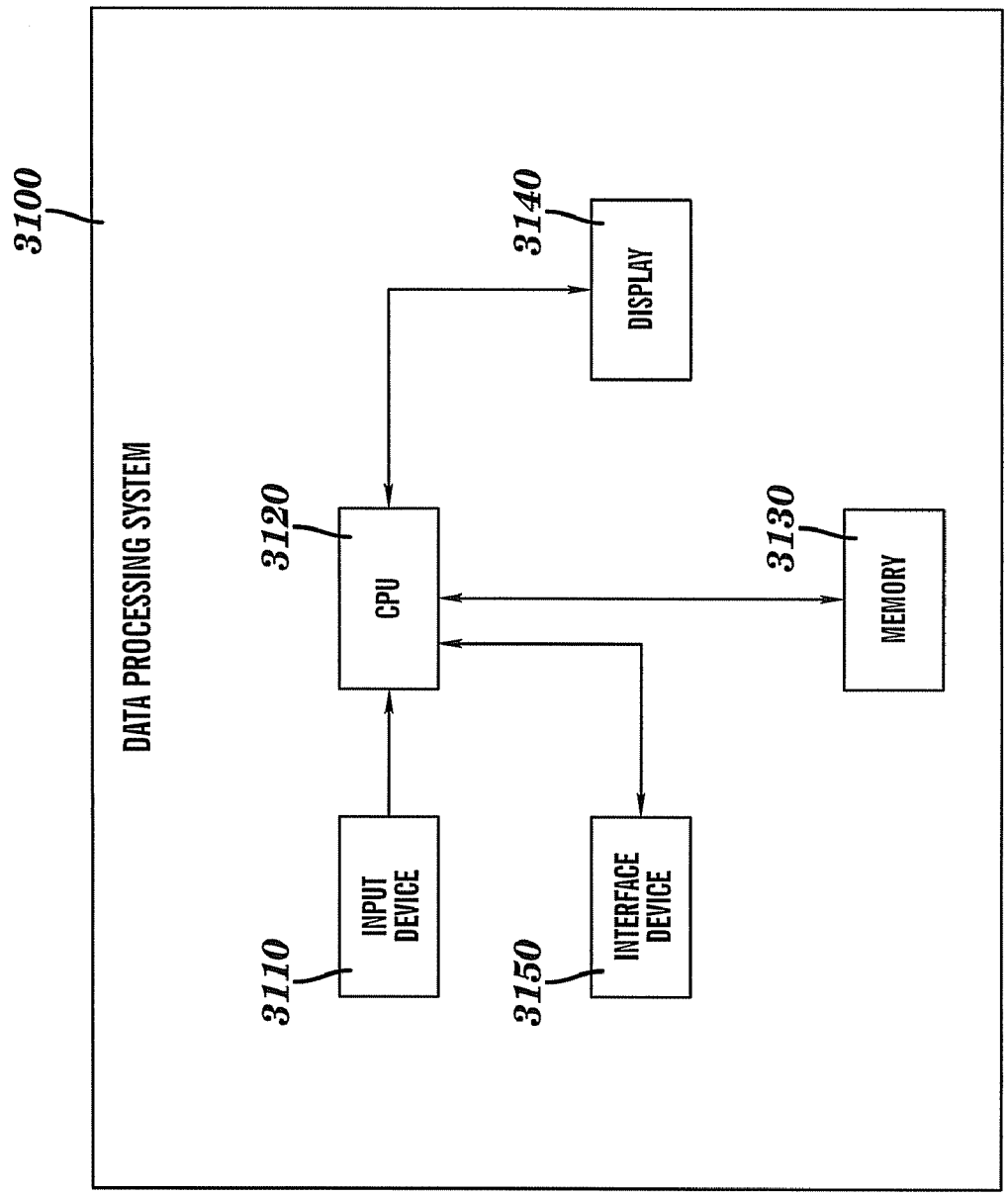
FIG. 19 is block diagram setting forth an illustrative computer program product for performing high data rate wireless transmission and reception.

FIG. 19 is block diagram setting forth an illustrative computer program product for performing high data rate wireless transmission and reception. It is to be clearly understood that FIG. 19 is illustrative in nature, as other systems, devices, or apparatuses not shown in FIG. 19 may also be used to implement embodiments of the invention. A data processing system 3100 includes an input device 3110, a central processing unit ("CPU") 3120, memory 3130, a display 3140, and an interface device 3150. The input device 3110 may include a keyboard, a mouse, a trackball, or a similar device. The CPU 3120 may include dedicated coprocessors and memory devices. The memory 3130 may include RAM, ROM, databases, or disk devices. The display 3140 may include a computer screen, terminal device, a hardcopy producing output device such as a printer or plotter, or a similar device. The interface device 3150 may include a connection or interface to a network 3103 such as the Internet, an intranet, a local area network (LAN), or a wide area network (WAN).

Optionally, the data processing system 3100 may be linked to other data processing systems over the network 3103. These other data processing systems may, but need not, include an application for developing one or more user interfaces (UIs) to provide internationalization of a user application. Of course, the data processing system 3100 may contain additional software and hardware, a description of which is not necessary for understanding the invention.

The data processing system 3100 has stored therein data representing sequences of instructions which, when executed, cause the methods described hereinafter to be performed. Thus, the data processing system 3100 includes computer executable programmed instructions for directing the system 3100 to implement any of the embodiments of the present invention. The programmed instructions may be embodied in at least one hardware, firmware, or software module 3170 resident in the memory 3130 of the data processing system 3100. Alternatively or additionally, the programmed instructions may be embodied on a computer readable medium (such as a CD disk or floppy disk) which may be used for transporting the programmed instructions to the memory 3130 of the data processing system 3100. Alternatively or additionally, the programmed instructions may be embedded in a computer-readable, signal or signal-bearing medium that is uploaded to the network 3103 by a vendor or supplier of the programmed instructions, and this signal or signal-bearing medium may be downloaded through an interface 3150 to the data processing system 3100 from the network 3103 by end users or potential buyers.

The capabilities of the present invention can be implemented in software, firmware, hardware or some combination thereof. As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While various preferred embodiments of the invention have been described, it will be understood that those skilled in the art, both now and in the future, may make various improvements and enhancements which fall within the scope of the claims which follow. These claims should be construed to maintain the proper protection for the inventions described herein.

What is claimed is:

1. A method for performing high data rate wireless transmission and reception, the method comprising:
    transmitting minimum shift-keyed (MSK) data by multiplexing a first MSK data stream and a second MSK data stream; and
    receiving the transmitted MSK data by performing phase recovery and demodulation using an FM discriminator;
    wherein the FM discriminator includes a demodulation circuit that implements a 45-degree phase shift prior to performing the demodulation.

2. The method of claim 1 wherein the first MSK data stream is substantially 90-degree phase-shifted with respect to the second MSK data stream.

3. The method of claim 1 wherein the FM discriminator selects one high frequency component from a plurality of high frequency components, and selects one low frequency component from a plurality of low frequency components.

4. The method of claim 1 for use with orthogonal minimum shift-keyed (OMSK) data.

5. A method for performing high data rate wireless transmission and reception, the method comprising:
    transmitting minimum shift-keyed (MSK) data by multiplexing a first MSK data stream and a second MSK data stream; and
    receiving the transmitted MSK data by performing phase recovery and demodulation using an FM discriminator;
    wherein transmitting is performed using a first pulse shaping wave denoted as $\cos(\pi t/2T)$ and a second pulse shaping wave denoted as $\sin(\pi t/2T)$.

6. The method of claim 5 wherein the first and second pulse shaping waves are switched according to a plurality of IQ input symbols into which at least one of the first or second pulse shaping waves have been encoded.

7. A system for performing high data rate wireless transmission and reception, medium readable by a processing circuit and storing instructions for execution by the comprising:
    a transmitting circuit configured to transmit minimum shift-keyed (MSK) data by multiplexing a first MSK data stream and a second MSK data stream; and
    a receiving circuit configured to receive the transmitted MSK data by performing phase recovery and demodulation using an FM discriminator;
    wherein the FM discriminator includes a demodulation circuit that implements a 45-degree phase shift prior to performing the demodulation.

8. The system hardware product of claim 7 wherein the first MSK data stream is 90-degree phase-shifted with respect to the second MSK data stream.

9. The system of claim 7 wherein the FM discriminator selects one high frequency component from a plurality of high frequency components, and selects one low frequency component from a plurality of low frequency components.

10. The system of claim 7 for use with orthogonal minimum shift-keyed (OMSK) data.

11. A system for performing high data rate wireless transmission and reception, comprising:
    a transmitting circuit configured to transmit minimum shift-keyed (MSK) data by multiplexing a first MSK data stream and a second MSK data stream; and
    a receiving circuit configured to receive the transmitted MSK data by performing phase recovery and demodulation using an FM discriminator;

wherein transmitting is performed using a first pulse shaping wave denoted as $\cos(\pi t/2T)$ and a second pulse shaping wave denoted as $\sin(\pi t/2T)$.

12. The system of claim 11 wherein the first and second pulse shaping waves are switched according to a plurality of IQ input symbols into which at least one of the first or second pulse shaping waves have been encoded.

* * * * *